United States Patent
Ushiyama

(10) Patent No.: US 10,894,493 B2
(45) Date of Patent: Jan. 19, 2021

(54) VEHICLE SEAT HAVING A SEAT COVER

(71) Applicant: TOYOTA BOSHOKU KABUSHIKI KAISHA, Aichi-ken (JP)

(72) Inventor: Takeshi Ushiyama, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 64 days.

(21) Appl. No.: 16/251,714

(22) Filed: Jan. 18, 2019

(65) Prior Publication Data
US 2019/0225124 A1    Jul. 25, 2019

(30) Foreign Application Priority Data
Jan. 19, 2018 (JP) ................................ 2018-007292

(51) Int. Cl.
*B60N 2/58* (2006.01)

(52) U.S. Cl.
CPC ......... *B60N 2/5825* (2013.01); *B60N 2/5883* (2013.01)

(58) Field of Classification Search
CPC .. B60N 2/5816; B60N 2/5825; B60N 2/5883; A47C 31/023
See application file for complete search history.

(56) References Cited

U.S. PATENT DOCUMENTS

| | | | | |
|---|---|---|---|---|
| 5,927,749 A * | 7/1999 | Homier | ............... | B60N 2/5883 280/728.3 |
| 6,116,175 A * | 9/2000 | Ito | ......................... | A41D 27/24 112/475.06 |
| 6,886,479 B1 * | 5/2005 | Hori | ..................... | B60N 2/5883 112/470.27 |
| 2015/0307002 A1 | 10/2015 | Ushiyama | | |
| 2015/0307004 A1 * | 10/2015 | Ushiyama | ............ | B60N 2/6027 297/452.18 |
| 2016/0375807 A1 * | 12/2016 | Kageyama | ............... | B60N 2/58 297/452.61 |
| 2018/0037145 A1 * | 2/2018 | Moroi | .................. | B60N 2/5825 |

FOREIGN PATENT DOCUMENTS

JP         2015-209079 A     11/2015

* cited by examiner

*Primary Examiner* — Milton Nelson, Jr.
(74) *Attorney, Agent, or Firm* — Greenblum & Bernstein, P.L.C.

(57) ABSTRACT

A vehicle seat including: a seat cover including: a general cover part; and a sheet-shaped member configured by one sheet and folded inward, and an internal structure covered with the seat cover, and the sheet-shaped member has: a drawing cover part locked to the internal structure; and a concealing cover part covering the drawing cover part from outside of the seat, the sheet-shaped member has: a connection end part; and a pair of free end parts extending from the connection end part, and the sheet-shaped member is connected to an edge of the general cover part at a connection part on the connection end part, and the drawing cover part is formed at one of the pair of free end parts disposed inside the seat and the concealing cover part is formed at the other one of the pair of free end parts disposed outside the seat.

7 Claims, 8 Drawing Sheets

VEHICLE SEAT HAVING A SEAT COVER

CROSS-REFERENCE TO RELATED APPLICATIONS

This application claims priority from Japanese Patent Application No. 2018-007292 filed on Jan. 19, 2018, the entire contents of which are incorporated herein by reference.

TECHNICAL FIELD

The present disclosure relates to a vehicle seat including a seat cover and an internal structure covered with the seat cover, the seat cover including a drawing cover part locked to the internal structure or the like and a concealing cover part covering outside of the drawing cover part.

BACKGROUND

A vehicle seat of the above type in which a seat cushion serving as a seat surface includes a cushion frame, a cushion pad, and a cushion cover is disclosed in JP-A-2015-209079. In the vehicle seat, the cushion pad, which forms a seat shape and elastically supports an occupant, is disposed on the cushion frame serving as the seat frame, and is further covered with the cushion cover. In this manner, the cushion pad and the cushion frame in the known technique, which correspond to the internal structure in the present disclosure, are covered with the cushion cover which corresponds to the seat cover in the present disclosure.

In the known technique, a rear end portion of the cushion cover is locked to the cushion frame, and is configured not to be exposed as much as possible in view of appearance of the seat. That is, the cushion cover is formed by a plurality of cover pieces sewn together, and a hook is attached to one of the cover pieces serving as the rear end portion. The cover piece serving as the rear end portion corresponds to the drawing cover part in the present disclosure, and is locked to the cushion frame via the hook. Further, a sheet-shaped carpet is sewn to a sewn position between the cover piece serving as the rear end portion and another cover piece (a general cover part in the present disclosure) located on a front side of the cushion cover. The carpet corresponds to the concealing cover part in the present disclosure, and is covered on the cover piece serving as the rear end portion from outside of the seat. In this manner, the cover piece serving as the rear end portion in the known technique is configured to be covered with the carpet so as to not be exposed as much as possible.

In the cushion cover (seat cover) described above, the cover piece serving as the rear end portion and the carpet are formed by different members. For this reason, a configuration in the known technique is not always applicable from a viewpoint of reducing the number of components in a seat and the like.

SUMMARY

The present disclosure is made in view of the above circumstance. An object of the present disclosure is to lock the seat cover to the internal structure or the like with good appearance while preventing an increase in the number of components in the seat as much as possible.

As a method for solving the above problem, an aspect of the present disclosure is a vehicle seat including a seat cover forming a design surface of the seat, the seat cover including: a general cover part serving as the design surface of the seat; and a sheet-shaped member configured by one sheet and folded inward, and an internal structure covered with the seat cover, and the sheet-shaped member has: a drawing cover part that is configured to be locked, in a state of being connected to the general cover part, to the internal structure or another member disposed on the seat; and a concealing cover part covering the drawing cover part from outside of the seat, and the sheet-shaped member has: a connection end part serving as an inward folded position; and a pair of free end parts extending from the connection end part, and the sheet-shaped member is connected to an edge of the general cover part at a connection part on the connection end part, and with the connection part as a boundary, the drawing cover part is formed at one of the pair of free end parts disposed inside the seat and the concealing cover part is formed at the other one of the pair of free end parts disposed outside the seat.

DETAILED DESCRIPTION

Figure 1:
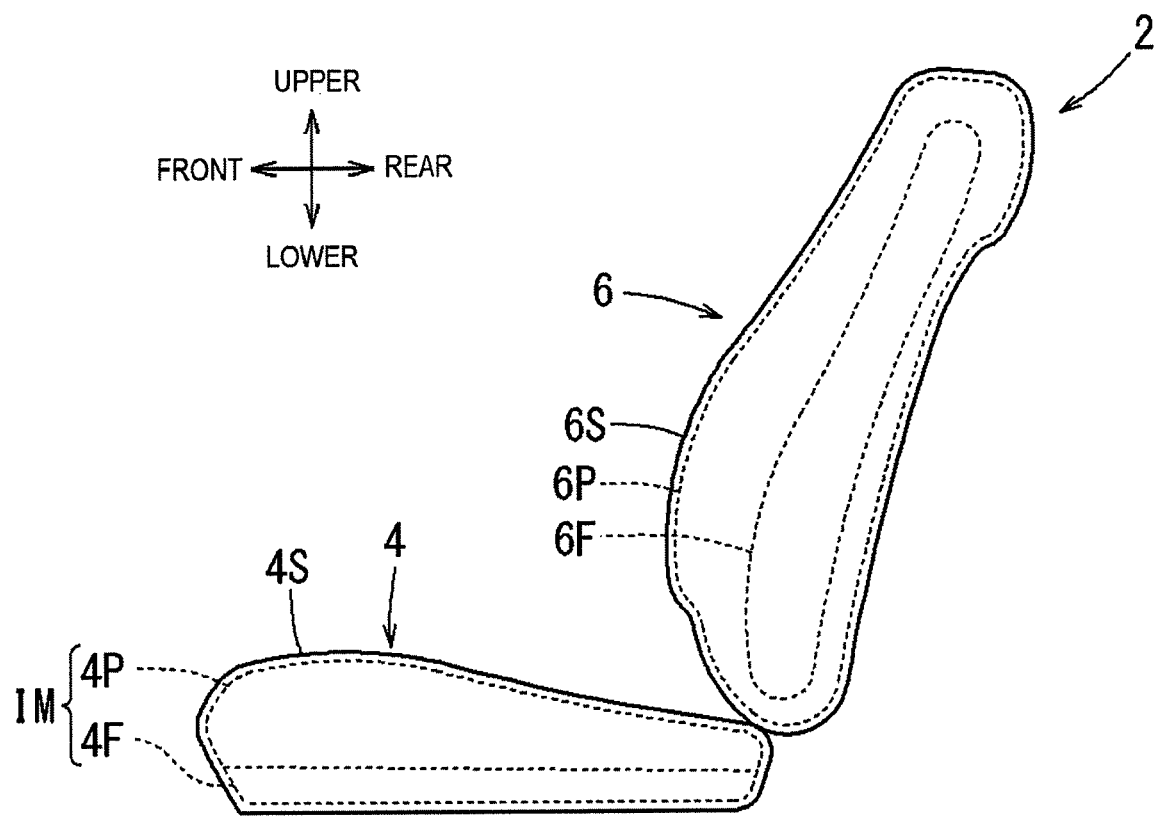
FIG. 1 is a schematic side view of a vehicle seat.

Hereinafter, modes for carrying out the present disclosure are described with reference to FIGS. 1 to 10. For convenience, arrows indicating a front-rear direction, a left-right direction, and an up-down direction of a vehicle seat are appropriately illustrated in the drawings. A vehicle seat 2 in FIG. 1 includes a seat cushion 4 and a seat back 6. These seat components (4, 6) include seat frames (4F, 6F) serving as frames of the seat, seat pads (4P, 6P) that form the seat shape, and seat covers (4S, 6S) that cover the seat pads, respectively. A lower portion of the seat back 6 is foldably connected to a rear portion of the seat cushion 4. An upper portion of the seat back 6 in an upright state can be provided with a headrest (not illustrated).

First Embodiment (Exemplary Arrangement of Sheet-shaped Member to Seat Cushion)

Figure 2:
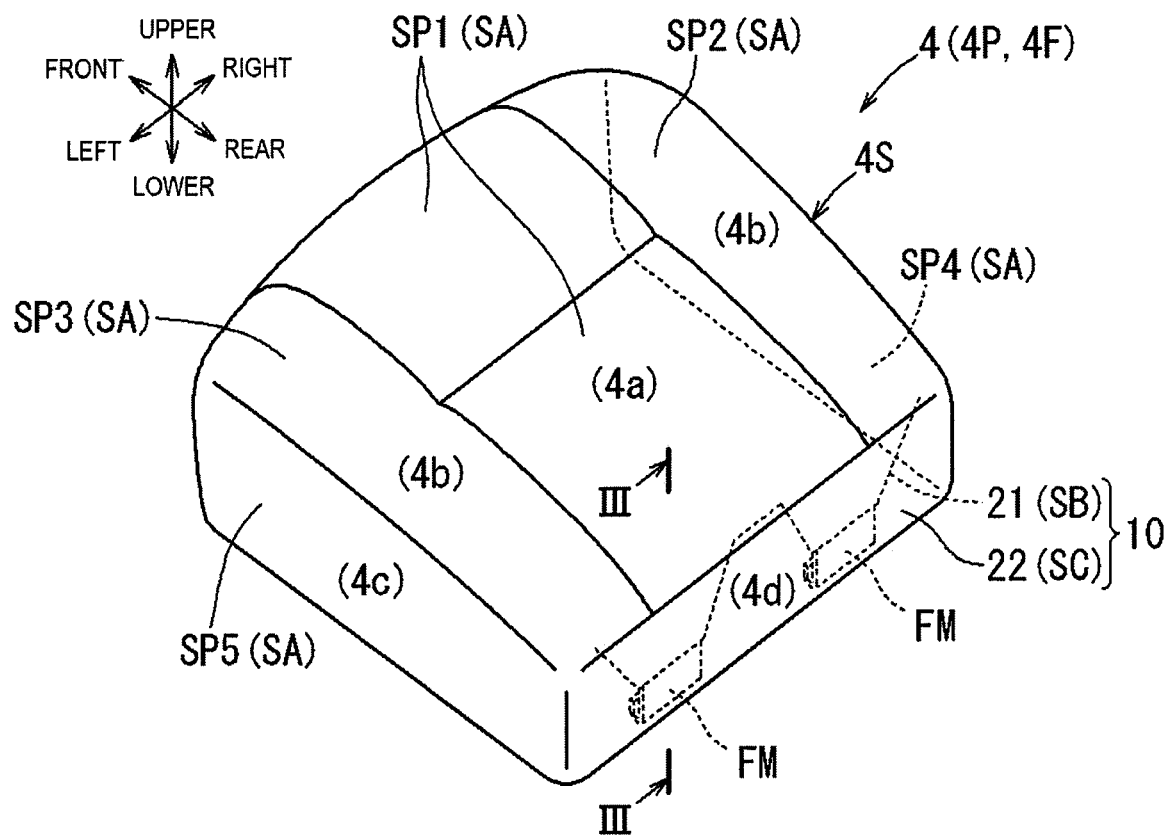
FIG. 2 is a perspective view of a seat cushion.
Figure 3:
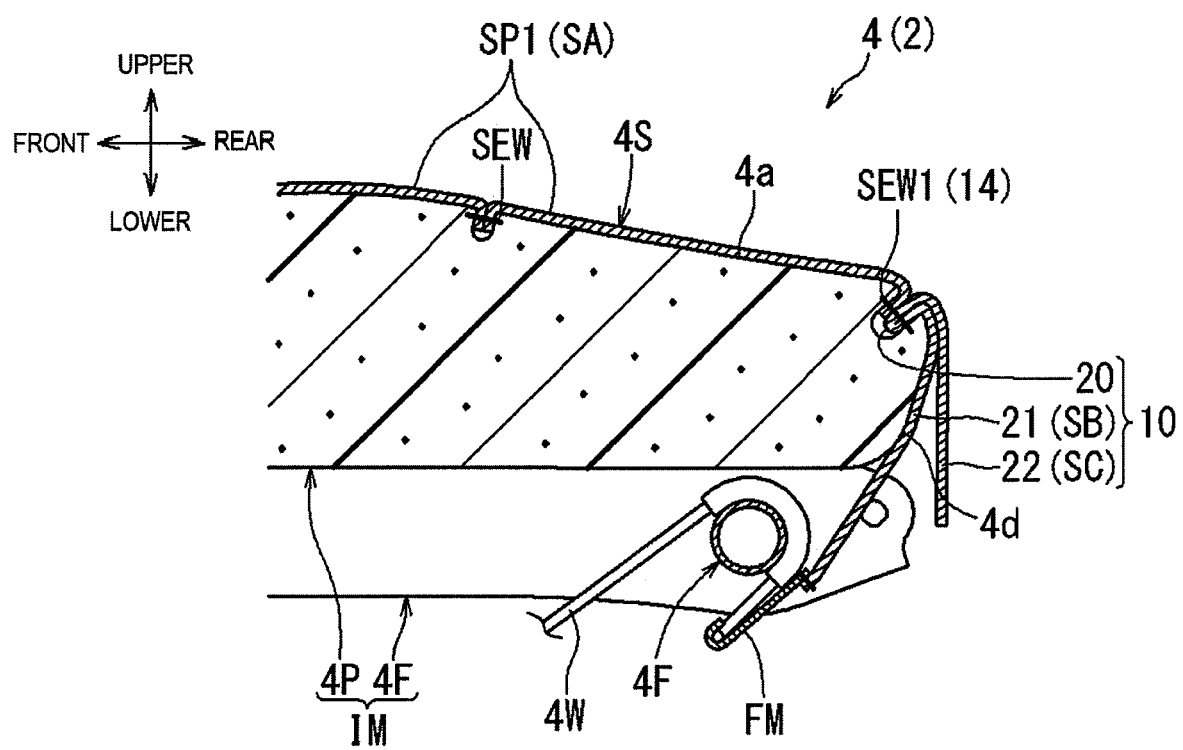
FIG. 3 is a schematic cross-sectional view of the seat cushion corresponding to a cross section along a line in FIG. 2.

The seat cushion 4 illustrated in FIGS. 1 to 3, which serves as a seat portion for an occupant, is rectangular as viewed from above. The seat cushion 4 includes the above-described basic components 4F, 4P, 4S (details of each member are described below). In the seat cushion 4, the seat frame 4F and the seat pad 4P, which form an internal structure IM, are covered with the seat cover 4S that forms a design surface of the seat. The seat cover 4S includes a plurality of cover parts (a general cover part SA, a drawing cover part SB, and a concealing cover part SC) to be described below. The general cover part SA that forms the design surface of the seat is locked to the inner structure IM via the drawing cover part SB. An outer side (mainly a rear side in the drawings) of the drawing cover part SB is covered with the concealing cover part SC in consideration of good appearance of the seat. In this way, the plurality of cover parts SA, SB, SC are provided in the seat cover 4S in consideration of the good appearance of the seat and the like. In such a configuration, however, the number of components in the seat should be avoided increasing excessively as much as possible.

Therefore, in the present embodiment, the seat cover 4S is locked to the internal structure IM with good appearance while preventing the increase in the number of components in the seat as much as possible with configurations to be described below (a sheet-shaped member 10 and the like). Hereinafter, the configurations are described in detail.

[Internal Structure (Seat Frame, Seat Pad)]

In the seat cushion 4, as illustrated in FIGS. 1 and 3, the seat frame 4F and the seat pad 4P serving as the internal structure IM are covered with the seat cover 4S and disposed inside the seat. Typically, the seat frame 4F is substantially rectangular or arcuate in a top view, and can be formed of a material having good rigidity such as metal or hard resin. The seat frame 4F is provided with, in a frame thereof, a frame wire 4W that supports a lower surface of the seat pad 4P. For example, the frame wire 4W illustrated in FIG. 3 is formed of a metal wire elongated in the front-rear direction. A rear portion of the frame wire 4W has a substantially horizontal U-shape and is locked to the seat frame 4F.

The seat pad 4P forms a shape of the seat cushion 4, and can be formed of, for example, polyurethane foam (density: 10 kg/m$^3$ to 60 kg/m$^3$). Referring to FIG. 2, the seat pad 4P includes a main top portion 4a, left and right side top portions 4b, left and right frame portions 4c, and rear surface portion 4d. The main top portion 4a is in a center in a seat width direction (the left-right direction) where an occupant may be seated on. The left and right side top portions 4b relatively bulge on lateral sides of the main top portion 4a. The left and right frame portions 4c form lateral surfaces of the seat cushion 4 in the left-right direction. The rear surface portion 4d forms a rear surface of the seat cushion 4. The rear surface portion 4d has, in middle in the left-right direction, a protruding part (not illustrated) protruding backward such that parts of the rear surface portion 4d on left and right sides of the protruding part are relatively recessed.

[Seat Cover (General Cover Part)]

The seat cover 4S illustrated in FIGS. 1 to 3 includes the general cover part SA and the sheet-shaped member 10 (the drawing cover part SB and the concealing cover part SC) to be described below. Referring to FIG. 2, the general cover part SA covers the seat pad 4P excluding the rear surface portion 4d, and is formed by a plurality of cover pieces sewn together. That is, the general cover part SA includes a main cover piece SP1, left and right side cover pieces SP2, SP3, and left and right frame cover pieces SP4, SP5. As for a material of the cover pieces SP1 to SP5, a surface member capable of forming a design surface of a seat can be used, such as leather (natural leather, synthetic leather) and fabric (woven fabric, knitted fabric, nonwoven fabric). The main cover piece SP1 covers the main top portion 4a, and is formed by a pair of front and rear cover pieces (reference numerals omitted) sewn together. The left and right side cover pieces SP2, SP3 cover the side top portions 4b, respectively. The left and right frame cover pieces SP4, SP5 cover the frame portions 4c, respectively. Referring to FIG. 3, adjacent cover pieces and cover pieces are sewn together by a sewing line SEW.

[Sheet-Shaped Member]

Figure 4:
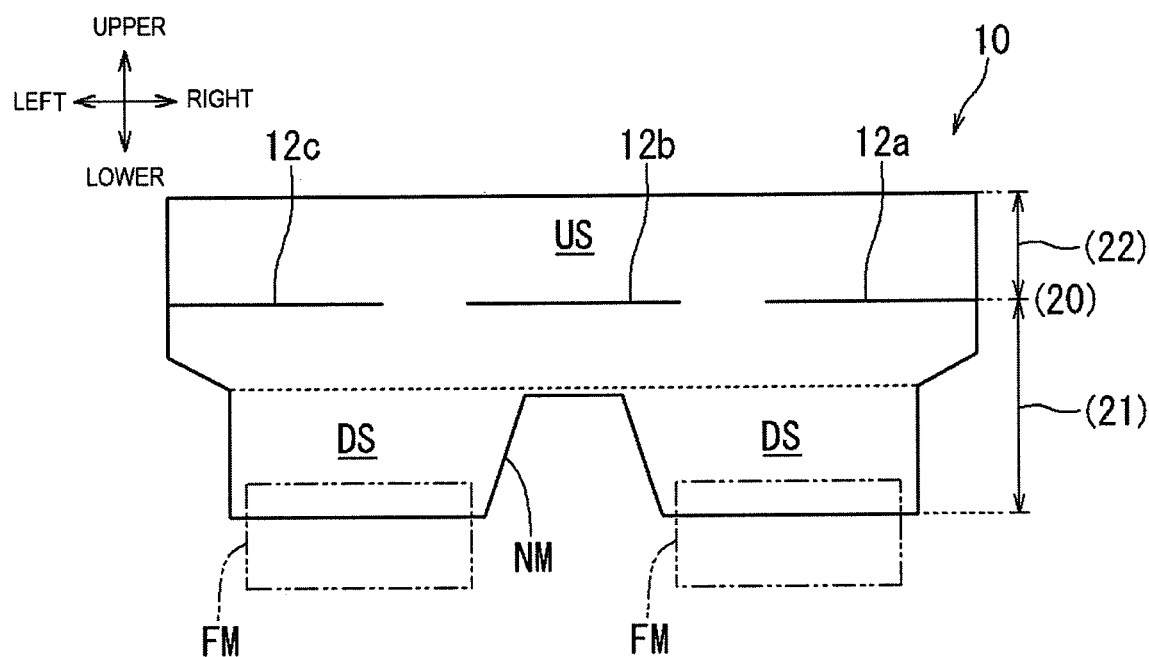
FIG. 4 is a schematic front view in which a sheet-shaped member in FIG. 3 is unfolded vertically.

Referring to FIG. 4, the sheet-shaped member 10 is configured by one sheet having a substantially rectangular shape in a front view when unfolded, and can be divided into three pairs of fold parts 12a to 12c and a plurality of parts 20, 21, 22 to be described below. As for a material of the sheet-shaped member 10, a flexible surface member which can be folded inward to form a U-shape in a cross-sectional view can be used. For example, the sheet-shaped member 10 may be formed of the material exemplified in the seat cover 4S, and may also be formed of a material (for example, a thick cloth) having rigidity higher than that of the seat cover 4S. An upper portion US of the sheet-shaped member 10 when unfolded has a rectangular shape elongated in the left-right direction in a front view, and has a dimension in the left-right direction to substantially cover the rear surface portion 4d of the seat pad 4P illustrated in FIGS. 2 and 3. Left and right edges of the sheet-shaped member 10 when unfolded are tightened at a boundary of the upper portion US and a lower portion DS. The lower portion DS of the sheet-shaped member 10 has a dimension in the left-right direction smaller than that of the upper portion. The lower portion DS of the sheet-shaped member 10 has, in middle in the left-right direction, a notch NM obtained by cutting a lower end of the sheet-shaped member 10 in a substantially trapezoidal shape, so that left and right parts of the lower portion DS protrude relatively downward with the notch NM interposed therebetween. The left and right parts of the lower portion DS are symmetrical in substantially rectangular shapes, and are each provided with a hook member FM which is a plate member having a J-shaped cross section. When the seat cover 4S to be described below is disposed, the protruding part (not illustrated) of the rear surface portion 4d of the seat pad 4P illustrated in FIG. 4 can be disposed in the notch NM of the lower portion DS of the sheet-shaped member 10.

[Fold Part]

Figure 5:
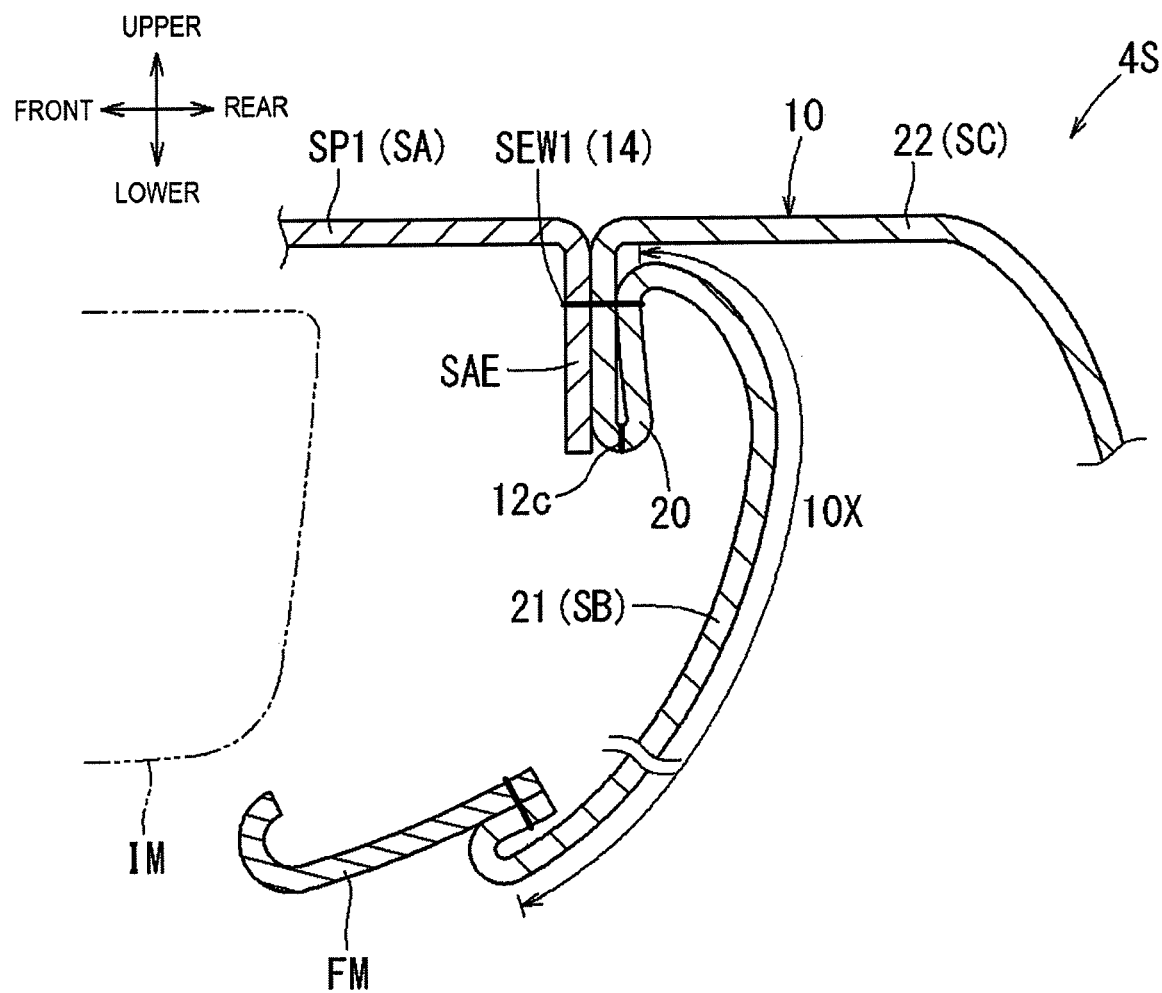
FIG. 5 is a cross-sectional view of a portion of a seat cover.
Figure 6:
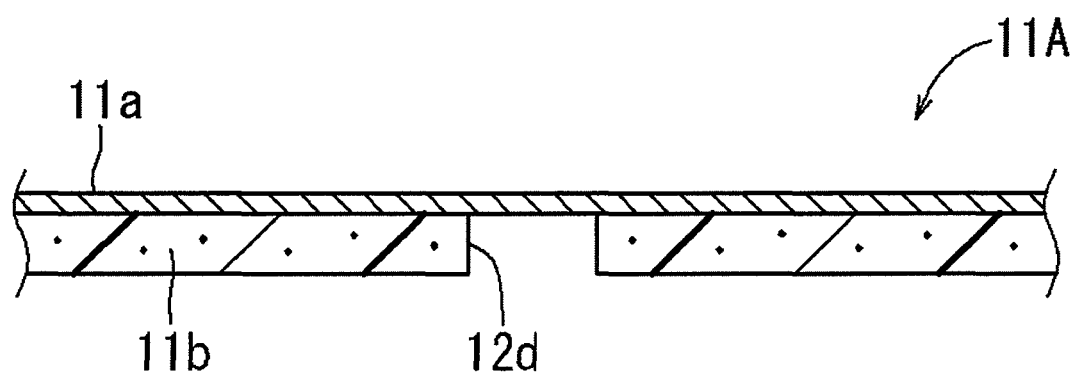
FIG. 6 is a cross-sectional view of a portion of a sheet-shaped member according to a first modification.

When the seat cover 4S to be described below is formed, as illustrated in FIGS. 3 and 5, the sheet-shaped member 10 is folded inward to form a substantially U-shape in the cross section. For this reason, referring to FIG. 4, the sheet-shaped member 10 has the three pairs of fold parts 12a to 12c that form folding lines, and is divided into a connection end part 20, a first free end part 21, and a second free end part 22 with reference to the inward-folded state. Here, the fold parts 12a to 12c are formed with penetrating parts penetrating the sheet-shaped member 10 in a thickness direction. In the present embodiment, the fold parts 12a to 12c are formed with the penetrating parts having a cut-like shape directed in the left-right direction. The fold parts 12a to 12c are located at positions (positions slightly close to the upper portion US) in an up-down direction of the sheet-shaped member 10, and are arranged substantially in a row at an appropriate interval in the left-right direction.

[Attaching of Sheet-Shaped Member]

Referring to FIGS. 3 to 5, the sheet-shaped member 10 is folded inward into a substantially horizontal U-shape with the fold parts 12a to 12c forming the folding lines. The inward-folded sheet-shaped member 10 includes the connection end part 20, the first free end part 21, and the second free end part 22. At this time, the sheet-shaped member 10 in the present embodiment can be smoothly folded inward into an appropriate shape and keep folded inward via the fold parts 12a to 12c (the penetrating parts). The connection end part 20 is, as illustrated in FIG. 5, an inward folded position of the sheet-shaped member 10, and is located in the front to connect the general cover part SA. The first free end part 21 is a part of the sheet-shaped member 10 disposed relatively inside the seat (a front side or a lower side in the drawings), and can extend rearward and downward from the connection end part 20. The first free end part 21 is formed by a part of the sheet-shaped member 10 which is the lower portion DS when the sheet-shaped member 10 is unfolded. A pair of hook members FM are attached to a lower end of the first free end part 21. The second free end part 22 is a part of the sheet-shaped member 10 disposed relatively outside the seat (a rear side or an upper side in the drawings), and can extend rearward and downward from the connection end part 20 in the same manner as the first free end part 21. The second free end part 22 is formed by a part of the sheet-shaped member 10 which is the upper portion US when the sheet-shaped member 10 is unfolded, and has a dimension in the left-right direction to substantially cover the rear surface portion 4d of the seat pad 4P illustrated in FIGS. 2 and 3. The second free end part 22 has a dimension in the up-down direction so that the first free end part 21 (the drawing cover part SB) can be concealed appropriately. In the present embodiment, the dimension of the second free end part 22 in the up-down direction is slightly larger than the that of the rear surface portion 4d.

[Forming of Connection Part]

Referring to FIGS. 3 and 5, the connection end part 20 of the sheet-shaped member 10 is connected to a rear end of the main cover piece SP1 serving as the general cover part SA. At this time, a seam allowance SAE at a rear edge of the main cover piece SP1 illustrated in FIG. 5 and the connection end part 20 of the sheet-shaped member 10 are connected to be overlapped in a thickness direction by a connection part 14. The connection part 14 in the present embodiment is formed by a connection sewing line SEW1 extending in the left-right direction, and is disposed to the connection end part 20 of the sheet-shaped member 10. The connection sewing line SEW1 penetrates and sews both a part of the connection end part 20 above the fold portions 12c and the like (a part where both the free end parts 21, 22 are overlapped with each other) and the seam allowance SAE of the main cover piece SP1. The main cover piece SP1 and the sheet-shaped member 10 are then unfolded into a sheet-shape with the connection part 14 serving as a starting point. At this time, the main cover piece SP1 is unfolded forward while the sheet-shaped member 10 is unfolded rearward with the connection sewing line SEW1 serving as the connection part 14 as the starting point.

[Forming of Drawing Cover Part and Concealing Cover Part]

In the sheet-shaped member 10, referring to FIG. 5, the first free end part 21 is disposed inside the seat (the front side or the lower side in FIG. 5) while the second free end part 22 is disposed outside the seat (the rear side or the upper side in FIG. 5), in which the connection sewing line SEW1 serving as the connection part 14 is taken as a boundary. In the present embodiment, the drawing cover part SB can be formed at the first free end part 21 located inside the seat, as to be described below. The drawing cover part SB can be locked to the internal structure IM by being pulled downward with the connection sewing line SEW1 serving as the connection part 14 as the starting point. The concealing cover part SC can be formed at the second free end part 22 located outside the seat, so the drawing cover part SB can be covered from outside by the concealing cover part SC. In the present embodiment, the connection end part 20 is sewn in a bag-shape by the connection sewing line SEW1 serving as the connection part 14. The fold part 12c and the like is located in the bag-shaped connection end part 20 but not located in a part of the sheet-shaped member 10 from the connection sewing line SEW1 to a lower end of the first free end part 21 (an area denoted by a reference numeral 10X in FIG. 5).

[Arrangement of Seat Cover]

Referring to FIGS. 1 to 3, when the seat cushion 4 is formed, the seat cover 4S covers the seat pad 4P (the internal structure IM) on the seat frame 4F from above. In this manner, as illustrated in FIG. 3, the general cover part SA of the seat cover 4S forms the design surface of the seat, and the seat frame 4F and the seat pad 4P that form the internal structure IM are covered by the seat cover 4S. The general cover part SA of the seat cover 4S is then locked to the internal structure IM via the drawing cover part SB, and the drawing cover part SB is covered with the concealing cover part SC in consideration of the appearance of the seat. In this way, the plurality of cover parts SA, SB, SC are provided in the seat cover 4S in consideration of the appearance of the seat and the like. In such a configuration, however, the number of components in the seat should be avoided excessively increasing as much as possible.

Therefore, referring to FIG. 3, the vehicle seat 2 according to the present embodiment includes the sheet-shaped member 10 configured by one sheet and folded inward. The sheet-shaped member 10 has a substantially horizontal U-shape in a cross-sectional view, and has the connection end part 20 that is the inward folded position and a pair of free end parts (the first free end part 21, the second free end part 22) extending from the connection end part 20. The sheet-shaped member 10 is connected to an edge of the general cover part SA by the connection part 14 in the connection end part 20. The sheet-shaped member 10, with the connection part 14 as the boundary, forms the drawing cover part SB at the first free end part 21, which is located inside the seat, and forms the concealing cover part SC at the second free end part 22 which is located outside the seat.

That is, in the seat cover 4S, referring to FIGS. 3 and 5, the sheet-shaped member 10 is connected to a rear end of the main cover piece SP1 serving as the general cover part SA by the connection part 14 (the connection sewing line SEW1) in the connection end part 20. The first free end part 21 of the sheet-shaped member 10 functions as the drawing cover part SB. The first free end part 21 serving as the drawing cover part SB extends downward along the rear surface portion 4d of the seat pad 4P from the connection sewing line SEW1 serving as the connection part 14. The hook member FM on the lower end of the first free end part 21 is locked to the frame wire 4W below the seat frame 4F. In this manner, the general cover part SA in the present embodiment can be stably locked to the internal structure IM via the drawing cover part SB. At this time, in this embodiment, the fold part 12c and the like is provided at positions different from the part of the sheet-shaped member 10 (the area denoted by the reference numeral 10X in FIG. 5) serving as the drawing cover part SB. Therefore, the drawing cover part SB can be locked to the internal structure IM more stably without influence of the fold part 12c and the like as much as possible. Further, the second free end part 22 of the sheet-shaped member 10 functions as the concealing cover part SC, and covers the drawing cover part SB from outside. The second free end part 22 serving as the concealing cover part SC extends upward from the connection sewing line SEW1 serving as the connection part 14, and then hangs downward on the rear surface portion 4d side of the seat pad 4P so as to cover the first free end part 21 from a rear side. By covering an outer side of the drawing cover part SB (the rear side or the upper side in FIG. 3) with the concealing cover part SC in this manner, the appearance of the seat is improved.

As described above, both the drawing cover part SB and the concealing cover part SC in the present embodiment are formed by the sheet-shaped member 10 that is configured by one sheet. Accordingly, the number of components in the seat is reduced as compared with a case where the two cover parts are formed by separate members. That is, it is necessary to prepare and sew cover pieces serving as the cover parts together in the case where the drawing cover part SB and the concealing cover part SC are formed by separate members. However, this is not necessary in the present embodiment, which contributes to reduction in the number of components in the seat and makes is possible to reduce manufacturing costs. In the present embodiment, the sheet-shaped member 10 is folded inward into an appropriate shape at the fold parts 12a to 12c. Accordingly, the drawing cover part SB and the concealing cover part SC can be disposed more appropriately. Further, the drawing cover part SB and the concealing cover part SC in the present embodiment can be disposed more appropriately by the fold parts 12a to 12c which are forming with penetrating parts having a cut-like shape (relatively simple structures). In the present embodiment, the fold parts 12a to 12c are provided at positions different from the part of the sheet-shaped member 10 serving as the drawing cover part SB. Accordingly, the drawing cover part SB can be locked to the internal structure IM more stably. Therefore, according to the present embodiment, the seat cover 4S can be locked to the internal structure IM with good appearance while preventing the increase in the number of components in the seat as much as possible.

[First Modification]

A sheet-shaped member may have various configurations in addition to the above configuration. For example, a sheet-shaped member 11A according to a first modification illustrated in FIG. 6 includes, on a back side of a cover member 11a made of cloth or leather, an elastically stretchable pad member 11b. The pad member 11b can be formed of a mat material made of foam resin such as slab urethane, a surface member having rubber elasticity, a surface member made of thick cloth such as felt, a 3D net material obtained by three-dimensionally entangling fibers, and the like. The cover member 11a and the pad member 11b are integrated by a method such as adhesion, fusion, and sewing. The sheet-shaped member 11A according to the modification further includes one or a plurality of fold parts 12d that form the folding lines. The fold parts 12d are formed by penetrating parts penetrating the pad member 11b, so the cover member 11a is exposed from the penetrating parts. In the present modification, the fold parts 12d are formed by the penetrating parts that partially penetrate the sheet-shaped member 11A, so rigidity of the sheet-shaped member 11A can be maintained as much as possible.

[Second Modification]

Figure 7:
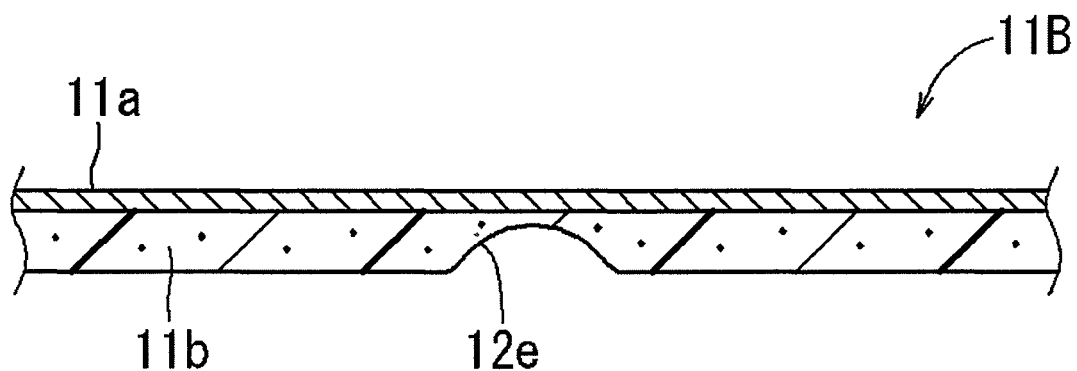
FIG. 7 is a cross-sectional view of a portion of a sheet-shaped member according to a second modification.

A sheet-shaped member 11B in a second modification illustrated in FIG. 7 has the same configuration as the sheet-shaped member in the first modification, except that the pad member 11b is integrated on a back side of the cover member 11a. The sheet-shaped member 11B in the present modification includes a fold part 12e which is a recess formed by partially recessing the pad member 11b. Such a fold part 12e (recess) can be formed by embossing and the like, and can also be formed by partially removing the pad member 11b. In this way, the fold part 12e is formed by a recess that is formed by partially recessing the sheet-shaped member 11B, so rigidity of the sheet-shaped member 11B can be maintained more appropriately.

[Third Modification]

Figure 8:
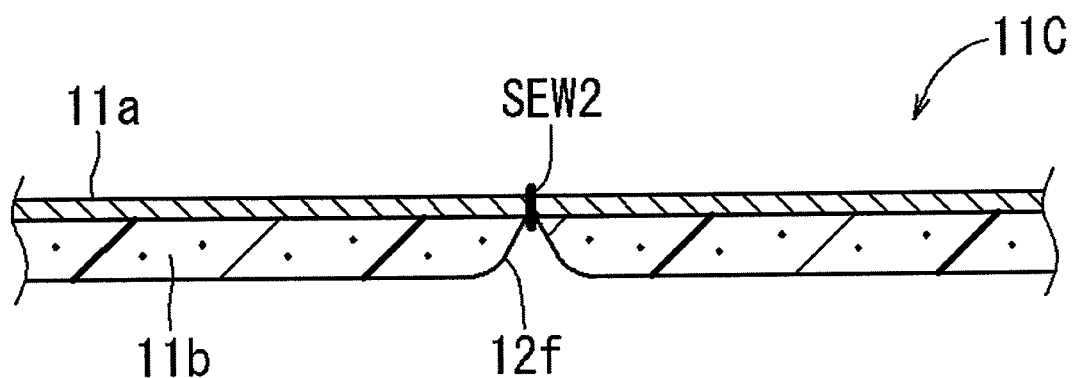
FIG. 8 is a cross-sectional view of a portion of a sheet-shaped member according to a third modification.
Figure 9:
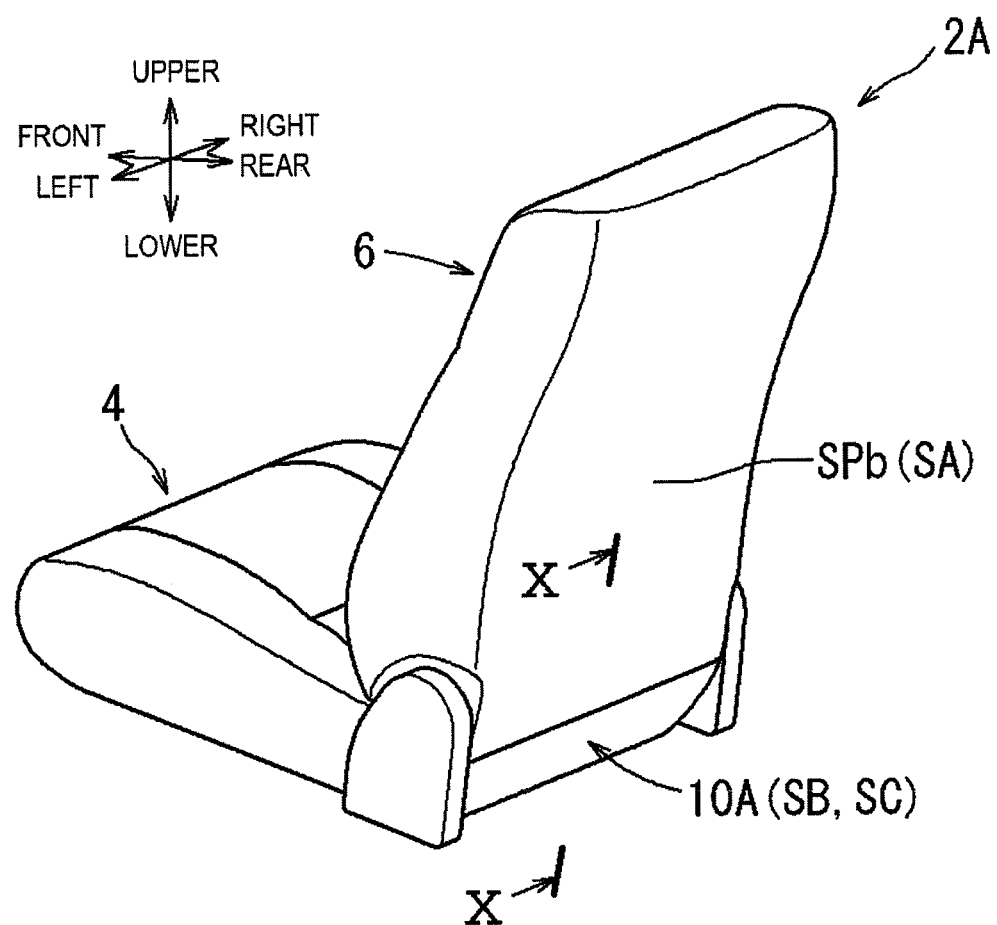
FIG. 9 is a perspective view of a vehicle seat according to a second embodiment.

A sheet-shaped member 11C in a third modification illustrated in FIG. 8 has the same configuration as the sheet-shaped member in the first modification, except that the pad member 11b is integrated on a back side of the cover member 11a. The sheet-shaped member 11C in the present modification is provided with a fold part sewing line SEW2 sewing the cover member 11a and the pad member 11b. The cover member 11a and the pad member 11b are sewn to be tightened in a compression direction. In the present modification, a fold part 12f is formed of a recess formed by tightening the fold part sewing line SEW2 and recessing the pad member 11b. In this way, the fold part 12f is formed by tightening the fold part sewing line SEW2, and it is not necessary to remove the cover member 11a and the pad member 11b Therefore, it is possible to maintain rigidity of the sheet-shaped member 11C further appropriately.

Second Embodiment (Exemplary Arrangement of Sheet-shaped Member to Seat Back)

A vehicle seat 2A in the present embodiment has substantially the same basic configuration as the vehicle seat 2 in the first embodiment. Accordingly, structures in common are denoted by the same reference numerals, and detailed descriptions of these structures are not repeated. In the vehicle seat 2A according to the second embodiment, referring to FIGS. 9 and 10, the seat pad 6P and a seat frame (not illustrated) in the seat back 6 serving as a backrest of an occupant are covered with the seat cover 6S. The seat pad 6P and the seat frame form the internal structure IM. The present embodiment is different from the first embodiment in that the seat cover 6S of the seat back 6 includes the general cover part SA and a sheet-shaped member 10A (the drawing cover part SB and the concealing cover part SC).

Here, the general cover part SA covers a part of the seat pad 6P excluding a rear lower portion thereof, and is formed by a plurality of cover pieces sewn together. For example, referring to FIG. 10, the seat cover 6S has, as the general cover part SA, a front cover piece SPa that covers a front surface of the seat pad 6P and a rear cover piece SPb that covers a rear surface of the seat pad 6P. The front cover piece SPa also corresponds to another member 40 disposed on the seat of the present disclosure, to which the drawing cover part SB to be described below is locked.

The sheet-shaped member 10A is configured by one sheet having substantially the same configuration as the sheet-shaped member in the first embodiment, and is folded inward into an inverted U-shape with a fold part forming a folding line. The sheet-shaped member 10A illustrated in FIG. 10 has a connection end part 20A, a first free end part 21A, and a second free end part 22A. These parts 20A to 22A have substantially the same basic configurations as corresponding parts of the sheet-shaped member in the first embodiment. Here, the connection end part 20A is an inward folded position of the sheet-shaped member 10A, and is disposed on an upper side to connect the general cover part SA. The first free end part 21A and the second free end part 22A are parts of the sheet-shaped member 10A which extend downward from the connection end part 20. The first free end part 21A is disposed relatively inside the seat (a front side in FIG. 10). The second free end part 22A is disposed relatively outside the seat (a rear side in FIG. 10). An elastically stretchable band member BM is attached to a lower end of the second free end part 22A.

Figure 10:
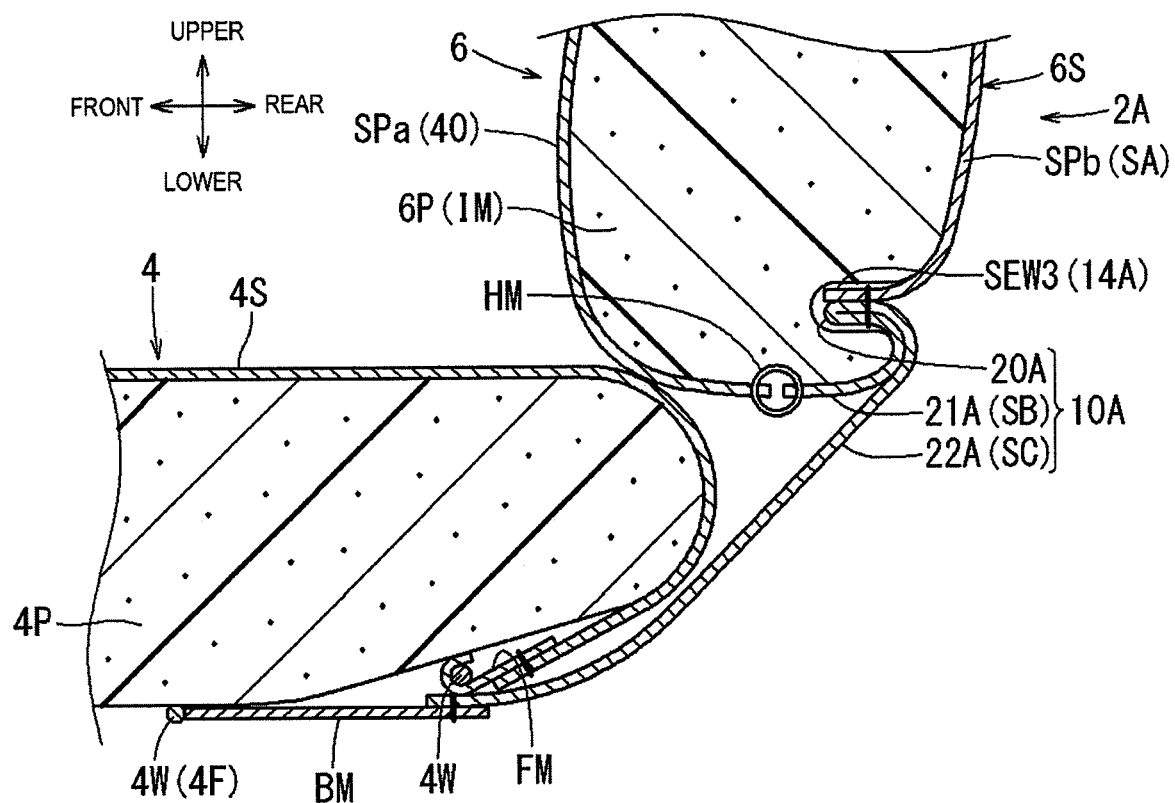
FIG. 10 is a schematic cross-sectional view of a portion of the vehicle seat corresponding to a cross section along a line X-X in FIG. 9.

Referring to FIG. 10, the connection end part 20A of the sheet-shaped member 10A is connected, by a connection part 14A, to a lower end of the rear cover piece SPb serving as the general cover part SA in the same order as in the first embodiment. The connection part 14A is formed by another connection sewing line SEW3 extending in the left-right direction. The first free end part 21A of the sheet-shaped member 10A in this embodiment functions as the drawing cover part SB. The first free end part 21A serving as the drawing cover part SB extends downward and forward along a lower surface of the seat pad 6P from the connection part 14A. A lower end of the first free end part 21A is locked to a lower end of the front cover piece SPa, which is another member 40, via an annular hanging member HM. In this way, the rear cover piece SPb serving as the general cover part SA in the present embodiment can be stably locked to the front cover piece SPa (another member 40) via the drawing cover part SB.

Referring to FIG. 10, the second free end part 22A of the sheet-shaped member 10A functions as the concealing cover part SC, and covers the first free end part 21A serving as the drawing cover part SB from outside. The second free end part 22A serving as the concealing cover part SC extends downward from the connection part 14A at a rear side of the first free end part 21A and reaches a lower surface of the seat cushion 4. The band member BM at the lower end of the second free end part 22A is hooked to the frame wire 4W. By covering an outer side of the drawing cover part SB (the rear side or the lower side in FIG. 10) with the concealing cover part SC in this manner, appearance of the seat is improved. Particularly, the concealing cover part SC also covers a boundary of the seat back 6 and the seat cushion 4, resulting in further improved design of the seat. Therefore, in the present embodiment, the seat cover 6S can also be locked to another member 40 and the internal structure IM of the seat cushion 4 with good appearance while preventing an increase in the number of components in the seat as much as possible.

The vehicle seats 2, 2A according to the present embodiments are not limited to the above-described embodiments, and various embodiments may be adopted. Although configurations (shapes, dimensions, positions, numbers, and the like) of the seat cover 4S, the sheet-shaped member 10, and the like are exemplified in the present embodiments, the present disclosure is not intended to limit these configurations. The sheet-shaped members can be connected to an appropriate position of the cover piece serving as the general cover part. For example, the sheet-shaped member in the first embodiment can be connected to the main cover piece, the side cover piece, and the frame cover piece at appropriate positions, which also applies to the sheet-shaped member in the second embodiment. A configuration of the connection part can be appropriately changed. In addition to a sewing line, a joint portion such as an adhesive portion, a fusion portion, and a staple can be used as a connection part. Shapes and dimensions of the sheet-shaped members can be appropriately selected according to a configuration of the seat pad. For example, the notch can be omitted from the sheet-shaped member, and a plurality of notches can also be provided thereto. The sheet-shaped members can be locked to the internal structure at an appropriate position. As a locking method, various members such as a hook member, a band member, and a hanging member can be appropriately selected. A projection of the internal structure can be inserted and locked to a hole of the sheet-shaped member.

The present embodiments describe examples in which various fold parts 12a to 12f are provided in the sheet-shaped members 10, 11A to 11C. The fold parts in the embodiments and the modifications can be appropriately selected for the sheet-shaped members. That is, it is possible to provide a fold part formed by a recess and the like as in the modifications in a sheet-shaped member formed by only a cover member, and to provide a fold part formed by a penetrating part having a cut-like shape in a sheet-shaped member formed by a cover member and a pad member. Positions of the fold parts can be changed appropriately, and a fold part can be provided at the first free end part (the area denoted by the reference numeral 10X in FIG. 5) or the second free end part when rigidity of the sheet-shaped member is secured. Additionally, dimensions of the fold parts can be changed appropriately, lengths of the first free end part and the second free end part can be substantially the same, and either the first free end part or the second free end part also can be made extremely long. When a plurality of fold parts are provided, the plurality of fold parts may be provided at equal or unequal intervals.

Although various configurations of the vehicle seats 2, 2A are exemplified in the present embodiments, the present disclosure is not intended to limit these configurations. The internal structure can be formed by at least one of the seat frame and the seat pad. The drawing cover part may be locked to the seat pad. Configurations in the present embodiments can be applied to all vehicle seats of a vehicle, an aircraft, a train, a ship, and the like.

The disclosure provides illustrative, non-limiting examples as follows:

A first aspect of the present disclosure is a vehicle seat including a seat cover forming a design surface of the seat, the seat cover including: a general cover part serving as the design surface of the seat; and a sheet-shaped member configured by one sheet and folded inward, and an internal structure covered with the seat cover, and the sheet-shaped member has: a drawing cover part that is configured to be locked, in a state of being connected to the general cover part, to the internal structure or another member disposed on the seat; and a concealing cover part covering the drawing cover part from outside of the seat, and the sheet-shaped member has: a connection end part serving as an inward folded position; and a pair of free end parts extending from the connection end part, and the sheet-shaped member is connected to an edge of the general cover part at a connection part on the connection end part, and with the connection part as a boundary, the drawing cover part is formed at one of the pair of free end parts disposed inside the seat and the concealing cover part is formed at the other one of the pair of free end parts disposed outside the seat. In such a seat configuration, it is desirable that the seat cover is locked to the internal structure with good appearance while preventing an increase in the number of components in the seat as much as possible. According to the present disclosure, both the drawing cover part and the concealing cover part are formed by the sheet-shaped member 10 that is configured by one sheet. Accordingly, the number of components in the seat is reduced as compared with a case where the two cover parts are formed by separate members.

A second aspect of the present disclosure is characterized in that in the first aspect, the connection end part is provided with a fold part that forms a folding line, and the fold part is formed with a recess, the recess being formed by recessing the sheet-shaped member in a thickness direction. According to the present disclosure, the drawing cover part and the concealing cover part can be disposed more appropriately by folding the sheet-shaped member inward into an appropriate shape at the fold part.

A third aspect of the present disclosure is characterized in that in the first aspect, the connection end part is provided with a fold part that forms a folding line, and the fold part is formed with a penetrating part penetrating the sheet-shaped member in a thickness direction. According to the present disclosure, the drawing cover part and the concealing cover part can be disposed more appropriately by folding the sheet-shaped member inward into an appropriate shape at the fold part.

A fourth aspect of the present disclosure is characterized in that in the third aspect, the fold part is formed with the penetrating part having a cut-like shape. According to the present disclosure, the drawing cover part and the concealing cover part can be disposed more appropriately by the fold part with relatively simple configurations.

A fifth aspect of the present disclosure is characterized in that in any one of the second aspect to the fourth aspect, the fold part is disposed at a position excluding a part of the sheet-shaped member from an end portion of the one of the pair of free end parts to the connection part. According to the present disclosure, the drawing cover part can be locked to the internal structure IM more stably by providing the fold part at the position different from the part of the sheet-shaped member serving as the drawing cover part.

A sixth aspect of the present disclosure is characterized in that in the first aspect, the connection part is disposed in a groove provided on the internal structure.

According to the first aspect of the present disclosure, the seat cover can be locked to the internal structure or the like with good appearance while suppressing the increase in the number of components in the seat as much as possible. According to the second aspect or the third aspect, the seat cover can be locked further reliably to the internal structure or the like with good appearance. According to the fourth aspect, the seat cover can be locked further reliably to the internal structure or the like with good appearance with a relatively simple configuration. According to the fifth aspect, the seat cover can be locked to the internal structure or the like more stably.

What is claimed is:

1. A vehicle seat comprising:
   a seat cover forming a design surface of the seat, the seat cover including:
      a general cover part serving as the design surface of the seat; and
      a sheet-shaped member configured by one sheet and folded inward, and
   an internal structure covered with the seat cover,
   wherein the sheet-shaped member has: a drawing cover part that is configured to be locked, in a state of being connected to the general cover part, to the internal structure or another member disposed on the seat; and a concealing cover part covering the drawing cover part from outside of the seat,
   wherein the sheet-shaped member has: a connection end part serving as an inward folded position; and a pair of free end parts extending from the connection end part,
   wherein the sheet-shaped member is connected to an edge of the general cover part at a connection part on the connection end part, and
   wherein, with the connection part as a boundary, the drawing cover part is formed at one of the pair of free end parts disposed inside the seat and the concealing cover part is formed at the other one of the pair of free end parts disposed outside the seat.

2. The vehicle seat according to claim 1,
   wherein the connection part is disposed in a groove provided on the internal structure.

3. The vehicle seat according to claim 1,
   wherein the connection end part is provided with a fold part that forms a folding line, and
   wherein the fold part is formed with a penetrating part penetrating the sheet-shaped member in a thickness direction.

4. The vehicle seat according to claim 3,
   wherein the fold part is formed with the penetrating part having a cut shape.

5. The vehicle seat according to claim 3,
   wherein the fold part is disposed at a position excluding a part of the sheet-shaped member from an end portion of the one of the pair of free end parts to the connection part.

6. The vehicle seat according to claim 1,
   wherein the connection end part is provided with a fold part that forms a folding line, and
   wherein the fold part is formed with a recess, the recess being formed by recessing the sheet-shaped member in a thickness direction.

7. The vehicle seat according to claim 6,
   wherein the fold part is disposed at a position excluding a part of the sheet-shaped member from an end portion of the one of the pair of free end parts to the connection part.

* * * * *